Patented Jan. 19, 1943

2,308,774

UNITED STATES PATENT OFFICE 2,308,774

CATALYTIC HYDROCARBON CONVERSION

Alex G. Oblad, Chicago, Ill., and Llewellyn Heard, Hammond, Ind., assignors to Standard Oil Company, Chicago, Ill., a corporation of Indiana No Drawing. Application July 5, 1940,
Serial No. 344,072

4 Claims. (Cl. 196—52)

This invention relates to the conversion of hydrocarbon oils at elevated temperatures and in the presence of selected catalysts comprising compounds of copper supported on an oxide of titanium. More specifically, the invention relates to the reforming of petroleum naphthas of low knock rating to produce gasoline of high knock rating by contacting with such a catalyst.

Many catalysts have been tried for the conversion or reforming of low knock rating naphtha into gasoline of high knock rating and many problems are encountered in this type of process. Some catalysts which have satisfactory catalytic activity can not be used commercially because they deteriorate rapidly, becoming ineffective after a relatively few regenerations. Other catalysts require too frequent regenerations to be economical. Still other catalysts produce an excessive amount of carbon deposit in relation to the gas and gasoline production.

We have discovered that oxygen-containing compounds of copper supported on titanium oxide and more particularly titania gel, produce very satisfactory catalysts for this reaction. These catalysts may be prepared in various ways but in general we prefer to employ the method of co-precipitation from the salts of the metals in solution. Thus, we may mix solutions of copper sulfate and titanium sulfate in the proper proportion and then add ammonium hydroxide or other base to bring about coagulation. The precipitate of hydrated oxides may be washed with water and dried; then heated at about 900° F. for 2 hours to effect activation. The product is hard and granular with particles of convenient size for use.

Instead of co-precipitating the copper oxide or other copper compound with titania, other methods may be used to prepare our catalyst, such as impregnating titania or titania gel with a copper salt, grinding titania and copper oxide in a ball mill followed by pelleting the mix, etc. In the latter case the finely pulverized mixture is preferably wet with water before pelleting.

Titanium sulfate, used in the preparation of our catalyst, may be made by dissolving $TiO_2$ in hot sulfuric acid. We prefer to regulate the proportions of the reagents to produce a catalyst having at least 50% of titanium oxide and generally we prefer to employ about 75 to 85% of titanium oxide in our catalyst. Good results have been obtained with a catalyst containing about 10% copper oxide and 90% titanium oxide. We also prefer to use precipitated $TiO_2$ or metatitanic acid because of its greater ease of solution in acid.

In preparing the catalyst, we may regulate the hydrogen ion concentration so that a gel is obtained. For example, titania gel may be prepared by regulating the hydrogen ion concentration between about 0.1 to 0.5 mol per liter. After washing the gel to remove salts it may be treated with a soluble copper salt, $Cu(NO_3)_2$, for example, then dried slowly at temperatures below 212° F. and activated by heating gradually, preferably to about 900 to 1200° F. for from a half hour to 5 hours before use as a hydrocarbon conversion catalyst. After the catalyst has been employed for a period of time, generally a matter of hours, its catalytic activity can be restored by subjecting it to regeneration in the presence of oxygen or an oxygen-containing gas such as air. The temperature of the regeneration step is controlled by regulating the rate of introducing gas and the oxygen concentration of the gas, preferably keeping the temperature below about 1100° F.

In addition to copper sulfate, copper oxide, etc., we employ copper silicate with certain advantages, particularly the advantage of long life and a high yield of gas per unit of carbon deposited on the catalyst. One of the characteristics of our catalyst is its unusually low carbon production. The following examples illustrate the conversion of petroleum naphthas with a catalyst composed of copper silicate dispersed on titanium oxide by ball milling, in which the ratio of $CuSiO_3$ to $TiO_2$ is 2:15 by weight.

| | Catalyst present | No catalyst |
|---|---|---|
| Temperature °F | 1050 | 1050 |
| Vol./vol./hr | 2.5 | 2 |
| Liquid produced | 204.5 | 212.2 |
| Gas produced liters | 15.3 | 6.97 |
| Average mol. wt. of gas | 14 | 17.2 |
| Per cent unsat. of liquid | 18 | 8.6 |
| Octane No. increase | 19 | 10 |
| Gas/carbon ratio L/gm | 67.3 | |

From these results it will be observed that the knock rating obtained with copper silicate is well above the knock rating obtained without a catalyst.

In another run with copper silicate catalyst containing 15 parts of $TiO_2$ to 2 parts of $CuSiO_3$, prepared by ball milling together the ingredients and pelleting, the following results were obtained.

| | |
|---|---|
| Vol. of catalyst | 20 cc. |
| Temperature | 1050° F. |
| Feed rate | 46.5 cc./hr. |
| Space velocity | |
| | 2.3 liquid feed vol./catalyst vol./hr. |
| Gas first ½ hr | 1490 cc. |
| Gas last ½ hr | 1425 cc. |
| Total gas | 15.28 lb. |
| Mol. wt. of gas | 14.0 |
| Liquid yield, per cent | 88.0 |
| Octane number increase | 18.5 |

The catalyst maintained its activity constant over the entire run and the appearance of the catalyst indicated that there was very little carbon residue. Copper silicate appears to have an advantage over copper sulfate and some other compounds of copper when distributed on titania because of its resistance to reduction. Copper sulfate became reduced in the cracking operation and lost part of its activity even though very little carbon residue was found upon regeneration.

Titanium oxide for the preparation of our catalyst may be obtained by treating the crude acid cake resulting from the digestion of ilmenite with sulfuric acid. In one method, we add the desired amount of copper salt solution to the acid cake and then add ammonium hydroxide in slight excess avoiding formation of complex ion. After thorough washing to remove soluble impurities and especially any alkali metals which may be present, the resulting product is dried and heated to 900° F. and thereafter ground and pelleted. The catalyst obtained is quite active for the treatment of mineral spirits. For example, at 1000° F., 25.3% of gasoline product was obtained having a knock rating 26.5 octane numbers (motor method) above that of the feed stock. Fixed gas amounting to 31.3 liters was produced in the reaction in treating 1 liter of the mineral spirits at the rate of 1 volume of hydrocarbon liquid per apparent volume of catalyst per hour.

In the treatment of low knock rating petroleum naphtha with our catalyst, we prefer to employ temperatures within the range of 900 to 1100° F. and relatively low pressures from about atmospheric to 200 pounds per square inch. The rate of contact may vary from about ½ volume of naphtha to about 4 volumes of naphtha per apparent volume of catalyst per hour. Under these conditions the increase in knock rating will usually be about 15 to 30 octane numbers. For example, a naphtha having a knock rating of 30 C. F. R. motor method may yield a product having an octane number of 60 by the motor method. Somewhat better results may be obtained by employing hydrogen in the reaction in which case the knock rating may be increased to 70 or 80 without serious loss in yield. When using hydrogen, we prefer to employ about 1 to 3 volumes of hydrogen per volume of naphtha vapor treated. The pressures used are such that net hydrogen will be produced, for example 50–450 lbs. per square inch. Hydrogen-containing gases may be recycled in the system.

Although we have described our invention specifically with respect to the treatment of low knock rating gasoline and naphthas, we may also employ our conversion catalysts for the treatment of heavy oils such as gas oil for the production of gasoline therefrom. In the treatment of gas oil we prefer to operate on a once through basis, usually converting from about 15 to 40% of the oil into gasoline of high knock rating. The temperatures employed for the conversion of gas oil are in general somewhat lower than those employed for naphtha conversion, and pressures are also generally lower. Thus, we may use a temperature of 850 to 950° F. and a pressure of atmospheric to about 50 pounds per square inch.

Using hydrogen or recycle gas containing hydrogen with the gas oil charge will minimize deposits on the catalyst and for this operation total pressures of 50 to 225 pounds per square inch are suggested.

Having thus described our invention what we claim is:

1. The method of converting hydrocarbon oils into gasoline of high knock rating which comprises contacting said oils at conversion temperatures with a catalyst comprising about 75 to 85 percent of titanium oxide in combination with a compound of copper containing oxygen.

2. A hydrocarbon conversion catalyst effective for the conversion of naphtha and gas oil into gasoline of high knock rating consisting essentially of at least 50 percent of titanium oxide in combination with copper silicate.

3. The process of reforming low knock rating naphthas which comprises contacting said naphthas at a temperature of about 950 to 1100° F. with a catalyst comprised of between 50 and 85 percent of titanium oxide and between about 50 and 15 percent of copper silicate.

4. The process of producing gasoline of high knock rating from petroleum hydrocarbons which comprises contacting said hydrocarbons at an elevated temperature above 850° F. with a catalyst comprising a dehydrated gel of titania and copper oxide wherein said titania constitutes about 75 to 90 percent of said catalyst.

ALEX G. OBLAD.
LLEWELLYN HEARD.